Patent 3,007,894

3,007,894
METHOD OF REACTING UNSATURATED POLYESTER WITH AN ORGANIC POLYISOCYANATE
Wilhelm Bunge, Leverkusen, and Karl-Heinz Mielke, Koln-Stammheim, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Aug. 4, 1958, Ser. No. 753,139
3 Claims. (Cl. 260—45.4)

The present invention relates to a new process of producing homogeneous polymers which are suitable, for instance, for making films, coating, lacquers, and adhesives.

This application is a continuation-in-part of our copending application Serial Number 384,511, entitled "Polymers from Polyesters, Diisocyanates, and Vinyl Compounds," filed October 6, 1953.

In the production of lacquers, films, coatings, impregnating agents, and adhesives from polyisocyanates and polyhydroxy compounds, solvents which are indifferent to isocyanates are employed to dissolve the reaction components. The quantity in which these solvents are employed depends upon the technical use envisaged for the products.

In order to obtain final products of high mechanical strength and good stability to external influences and chemicals it is necessary to remove the solvents as completely as possible after the reaction.

This can only be accomplished satisfactorily if films, coatings or impregnations are prepared in thin layers. If, however, films of the polymers of greater thickness are to be prepared, especially by air drying, substantial proportions of higher boiling solvents can generally not be removed.

In particular, the bonding properties of polymers prepared from polyisocyanates and polyhydroxy compounds are substantially affected when the solvents are retained, since the solvents can hardly escape after the parts to be united have been joined.

Due to the decrease in volume which is caused by the evaporation of solvents, difficulties are met in filling large surface irregularities and cracks in articles which are coated with solutions of polyisocyanates and polyhydroxy compounds.

In accordance with the invention we have found that new polymers suitable for making lacquers, films, coatings and adhesives can be obtained if the components are dissolved before being subjected to reaction in polymerizable mono- or polyvinyl compounds, instead of in the previously used solvents such as ethyl acetate, butyl acetate, and methylgylcol acetate.

It has been known in the prior art, as illustrated in United States Patent 2,780,613 issued to Louis C. Rubens on February 5, 1957, to produce copolymers from a prepolymer of polyesters and diisocyanates and vinylidene compounds. The two-step process produces highly satisfactory products from divalent polyesters and isocyanates; however, it has been found that it is impossible to use the Ruben two-step process when tri or higher valent ingredients are involved, in other words, when a trivalent branched polyester or a triisocyanate is employed. A prepolymer made according to Rubens from a tri or higher valent branched polyester and a diisocyanate or from a linear polyester and a triisocyanate will readily become insoluble. Such a prepolymer is incompatible with styrene or other vinyl monomers. When copolymerization is attempted, the styrene will polymerize by itself and a milky-white gell is obtained which has no technical interest.

Accordingly, the present invention provides a one-step process for the manufacture of homogeneous polymers which comprises reacting unsaturated branched chain hydroxy polyesters and polyisocyanates, both of which are dissolved in polymerizable vinyl compounds or polymerizable polyvinyl compounds.

Suitable vinylidene compounds for use in the process of the invention are, for instance, styrene, acrylates, methacrylates, or mixtures thereof, to which peroxides, for instance benzoyl peroxide, are added as reaction accelerators. While the quantity of the vinylidene compound to be added depends upon the practical use envisaged for the combined polyisocyanates and branched chain hydroxy polyesters, preferably only a minimum amount, that is, less than 50%, but at least about 10% is required, which is subtsantially equal to the quantity of solvent previously employed for the same purposes.

The vinylidene compounds serve first to promote mutual solution of the branched polyester and polyisocyanate and to give solutions of the desired viscosity. Cross-linked polyurethanes result from the polyisocyanates and the polyester after molding, and the vinylidene compound polymerizes at the same time. Completely homogeneous products are obtained by the process of the invention. By this process valuable solvent-resistant films, lacquer coatings and adhesives are obtained, via the intermediate stage of a true solution, without low boiling portions escaping to an appreciable extent. The invention thus allows of producing, in one processing step, layers of a thickness which cannot be prepared from true solutions without impairing the mechanical properties and stability to chemical influences.

The reaction is substantially accelerated when carried out in the presence of tertiary amines.

We have further found that the above-described process is excellently suited for producing plastics, for instance, molding compositions, laminated materials, cast resins, and sealing compounds. For this purpose the components, viz, polyisocyanates and the branched hydroxy polyesters, are first dissolved in an appropriate amount of polymerizable vinylidene compound, such as styrene, acrylates or methacrylates, and then caused to react during the course of molding, preferably in the presence of substances yielding radicals, whereby polyurethanes are formed and polymerization takes place.

In carrying out the process of the invention the solutions are subjected to temperatures at which the components react. The reactions can be substantially accelerated by the addition of tertiary amines and substances such as are employed in so-called redox polymerization.

Examples of suitable polyisocyanates are aliphatic, hydroaromatic, aromatic di- and triisocyanates, for instance, hexamethylene-1,6-diisocyanate, 4,4'-dicyclohexylmethane-diisocyanate, toluylene-diisocyanate, and those which are obtained by reaction of polyalcohols (see copending application, Serial Number 363,914, filed by Wilhelm Bunge and Otto Bayer) or of polyesters containing hydroxy groups with diisocyanates in an excess calculated on the hydroxy groups.

Unsaturated branched chain polyhydroxy polyesters, that is nonlinear polyesters which are suitable for forming cross-linked products with polyisocyanates in the presence of vinylidene compounds, include esterification products of polyalcohols such as trimethanolpropane, glycerol, triethanol amine and pentaerythritol with ethyenically unsaturated polyvalent carboxylic acids such as maleic acid, fumaric acid, glutaconic acid, citraconic acid, itaonic acid, ethidenemalonic acid, mesaconic acid, allylmalonic acid, allylsuccinic acid, as such, or in mixture with dihydric alcohols; such as, glycol, diethylene glycol, butylene glycol, ethyldimethanolamine, and methyldiethanolamine, hexanediol, octanediol, butenediol, and other carboxylic acids, such as, oxalic acid, succinic acid, adipic acid, sebacic acid, thiodiglycolic acid, and phthalic acid. As shown in the working examples, the polyester has an hydroxyl content of from about 4.9 percent to about 9.5 percent.

The unsaturated branched hydroxyl polyester thus obtained, may contain other components such as, amino-alcohols, aliphatic or aromatic amines, mono-alcohols, or higher fatty acids, which can be incorporated by condensation to modify the properties of the compounds. Depending upon the nature and quantity of the starting materials employed, molding compositions, for instance moldings, sealing compounds, laminated materials, and cast resins are obtained, which are rigid or elastic and insoluble or slightly soluble.

Of course, fillers, pigments, and plasticizers may complementarily be employed in the process of the invention.

The peroxides required for the polymerization or co-polymerization may be added to the branched chain hydroxy polyesters or the polyisocyanates either before or after mixing with the monomeric vinylidene compounds, or to mixtures of both components.

Instead of reacting the branched chain hydroxy polyesters and polyisocyanates in solution in monomeric vinylidene compounds, such as styrene, acrylates, or methacrylates, they may be reacted in solution in the corresponding polymerizable polyvinyl compounds.

The invention is further illustrated by the following examples, the parts being by weight:

Example 1

325 parts of a polyester containing 5.2% of hydroxyl groups, which is prepared from 2 mols of adipic acid,
3 mols of maleic acid,
4 mols of butylene glycol, and
2 mols of trimethylolpropane are dissolved in 100 parts of monomeric methacrylate and mixed with 90 parts of a toluylene diisocyanate and 3 parts of benzoylperoxide.

The solution is suitable for impregnating textile fabrics and making elastic lacquer coatings, preferably at temperatures of between 50° C. and 100° C.

Example 2

After being stabilized by addition of little quinone or copper oleate, 130 parts of trimethylolpropane dissolved in 120 parts of methyl methacrylate are introduced in portions at 60-70° C. into a solution of 500 parts of toluylene diisocyanate in 300 parts of methyl methacrylate. The reaction is completed by heating the mixture to 70° C. for 3 hours.

430 parts of the 60% polyisocyanate solution thus obtained are homogeneously mixed with 320 parts of a polyester containing 5.3% of hydroxyl groups, which is prepared from 3 mols of maleic anhydride,
2 mols of adipic acid,
4 mols of butyleneglycol, and
2 mols of trimethylolpropane, and diluted with 100 parts of methyl methacrylate. After addition of 6.8 parts of benzoylperoxide the lacquer solution yields dry and elastic films at moderately raised temperature. The films harden uniformly also when applied in thicker layers.

Example 3

430 parts of the 60% polyisocyanate solution in methyl methacrylate, described in Example 2, are intimately mixed with 170 parts of a polyester prepared from 3 mols of adipic acid and 4 mols of trimethylol propane and diluted with a further 100 parts of methyl methacrylate.

On addition of 5.2 parts of benzoylperoxide and 2 parts of hexahydrodimethylaniline the solution yields at about 80° C. within a short time insoluble films or lacquer coatings which are rigid also when applied in thick layers.

Example 4

130 parts of a mixture of 91 parts of trimethylolpropane and 39 parts of 1,3-butyleneglycol are introduced in portions at 90-95° C. into a solution of 500 parts of toluylene diisocyanate in 420 parts of styrene which has been stabilized by addition of a little quinone or copper oleate. The reaction is completed by heating the mixture for a short time.

420 parts of this solution are intimately mixed at room temperature with 250 parts of a polyester obtained by vacuum esterification of 3 mols of phthalic anhydride,
3 mols of adipic acid,
4 mols of octanediol, and
4 mols of trimethylolpropane, and applied to a textile fabric with a doctor blade after addition of 3 parts of benzoylperoxide. After heating to about 90° C. a strongly adhering, solvent-resistant, cohesive coating with good mechanical properties is obtained. The heating period may be shortened by addition of a tertiary amine as reaction accelerator.

Example 5

500 parts of the 60% solution of polyisocyanate in styrene, described in Example 4, are added after heating to 40-50° C. to 200 parts of a polyester containing 9.5% of hydroxyl groups, which is prepared by esterification of 3 mols of adipic acid and 4 mols of trimethylolpropane. This solution is diluted with a further 90 parts of styrene and applied to paper, wood, sheets or plates after addition of 6 parts of benzoylperoxide and 1 part of diethylaniline. Strongly adhering and extraordinarily resistant coatings are thus obtained. Special effects may be attained by adding soluble dyestuffs, pigments, polishing powder, and similar additives to the lacquer solution. Lacquers of the aforedescribed kind show high grade electric properties.

Example 6

64 parts of a polyester containing 5.3% of hydroxyl groups, which is prepared from 3 mols of maleic anhydride,
2 mols of adipic acid,
4 mols of butyleneglycol, and
2 mols of trimethylolpropane, are intimately mixed with 85 parts of the 60% solution of polyisocyanate in styrene, described in Example 4, after addition of 15 parts of styrene and 1 part of benzoylperoxide. The clear solution yields strongly adhering insoluble films on substrates of any desired material after a short baking time and is excellently suited for bonding sheets or plates of the most different material.

Example 7

340 parts of a polyester containing 4.9% of hydroxyl groups, which is prepared from 3 mols of maleic anhydride,
2 mols of adipic acid,
5 mols of butyleneglycol, and
1 mol of trimethylolpropane, by azeotropic esterification with benzene, are combined with 390 parts of the 60% solution of polyisocyanate in styrene, described in Example 4, and mixed with 3 parts of benzoylperoxide and 1 part of hexahydrodimethylaniline after addition of 75 parts of styrene. This solution is useful for making films of excellent properties and good elasticity also when applied in thicker layers by heating to 90-100° C. for a short period. This solution is also excellently suited for bonding the most different materials.

Example 8

A polyester containing 5% of free hydroxyl groups is prepared in known manner from 3 mols of trimethylolpropane,
1 mol of diethyleneglycol,
1 mol of fatty acid of linseed oil, and
3 mols of phthalic anhydride.

150 parts of this polyester are dissolved in 50 parts of styrene and homogeneously mixed with 250 parts of the 60% solution of polyisocyanate in styrene described in Example 4. By adding to the clear solution 3 parts of benzoylperoxide a lacquer solution is obtained which yields insoluble, rigid coatings on the most different substrates by baking at 50–90° C.

Example 9

325 parts of a polyester containing 5.2% of hydroxyl groups, which is prepared from 2 mols of adipic acid,
3 mols of moleic acid,
4 mols of butyleneglycol, and
2 mols of trimethylolpropane by vacuum esterification, are dissolved in 100 parts of monomeric methacrylate and mixed with 90 parts of toluylene diisocyanate and 3 parts of benzoylperoxide.

By casting this solution into molds, which are loosely filled with glass wool, rigid shaped castings of great tenacity and strength are obtained after heating for a short time.

Example 10

130 parts of trimethylolpropane dissolved in 120 parts of methyl methacrylate are introduced in portions at 60–70° C. into a solution of 500 parts of toluylene diisocyanate in 300 parts of methyl methacrylate after addition of a little quinone or copper oleate for stabilization. The reaction is completed by heating the reaction mixture at 70° C. for another 3 hours. 430 parts of the 60% polyisocyanate solution thus obtained are homogeneously mixed with 320 parts of a polyester containing 5.3% of hydroxyl groups, which is prepared from 3 mols of maleic anhydride,
2 mols of adipic acid,
4 mols of butyleneglycol, and
2 mols of trimethylolpropane, and diluted with 100 parts of methyl methacrylate. After addition of 6.8 parts of benzoyl peroxide the solution yields at moderately elevated temperatures uniformly hardened, transparent sealing compounds, which may be employed for instance for coating capacitors.

Example 11

430 parts of the 60% polyisocyanate solution in methyl methacrylate, described in Example 10, are intimately mixed with 170 parts of a polyester prepared from 3 mols of adipic acid and 4 mols of trimethylolpropane and diluted with further 100 parts of methyl methacrylate.

By adding to this solution 5.2 parts of benzoylperoxide and 2 parts of hexahydrodimethylaniline and casting into molds at 70–80° C., insoluble transparent shaped articles, which can be machined with metal cutting tools, are obtained within a short time.

Example 12

130 parts of a mixture of 91 parts of trimethylolpropane and 39 parts of 1,3-butyleneglycol are introduced in portions at 90–95° C. into a solution of 500 parts of toluylene diisocyanate in 420 parts of styrene stabilized with a little quinone or copper oleate. The reaction is completed by heating for a further short time.

420 parts of this solution are intimately mixed at room temperature with 260 parts of a polyester prepared from 3 mols of phthalic anhydride,
3 mols of adipic acid,
4 mols of octanediol, and
4 mols of trimethylolpropane by vacuum esterification, and applied to a textile fabric with a doctor blade after addition of 3 parts of benzoylperoxide. By superposing several webs of fabric thus treated under slight pressure and heating to about 90° C., preferably while maintaining the pressure, an intimately bonded laminated material is obtained.

Example 13

A solution of 14 parts of a linear polyester of 1 mol of adipic acid,
1 mol of maleic acid, and
2 mols of ethylene glycol in 6 parts of styrene, is intimately mixed with 4 parts of dry sawdust, and 0.2 part of benzoylperoxide added after addition of 5 parts of the 60% solution of polyisocyanate in styrene described in Example 12.

By casting this mixture into a mold and heating to about 80° C. under slight pressure moldings of high mechanical strength are obtained within a short period.

Example 14

500 parts of the 60% solution of polyisocyanate in styrene, described in Example 12, are introduced with stirring after heating to 40–50° C. into 200 parts of a polyester containing 9.5% of hydroxyl groups, which is prepared by esterification of 3 mols of adipic acid and 4 mols of trimethylolpropane. This solution is diluted with a further 90 parts of styrene and, after addition of 6 parts of benzoylperoxide and 1 part of diethylaniline, cast into a mold filled with several layers of glass fabric. After hardening under slight pressure, rigid plates with very good insulating properties are obtained.

Example 15

64 parts of a polyester containing 5.3% of hydroxyl groups, which is prepared from 3 mols of maleic anhydride,
2 mols of adipic acid,
4 mols of butyleneglycol, and
2 mols of trimethylolpropane, are intimately mixed with 85 parts of the 60% solution of polyisocyanate in styrene described in Example 12 (from toluylene diisocyanate and the mixture of trimethylolpropane and butyleneglycol), after addition of 15 parts of styrene and 1 part of benzoylperoxide. This mixture is mixed with 400 parts of carborundum powder ind introduced into molds. After hardening at about 80° C. abrasives with high abrasion resistance are obtained.

Example 16

340 parts of a polyester containing 4.9% of hydroxyl groups, which is prepared from 3 mols of maleic anhydride,
2 mols of adipic acid,
5 mols of butyleneglycol, and
1 mol of trimethylolpropane by azeotropic esterification with benzene, are combined with 390 parts of the 60% solution of polyisocyanate in styrene, described in Example 12, and mixed with 3 parts of benzoylperoxide and 1 part of hexahydrodimethylaniline after addition of 75 parts of styrene. By casting this solution into flat molds transparent and bubble-free plates of good surface resistance and high lustre are obtained after heating for a short time.

Example 17

A polyester containing 5.0% of hydroxyl groups is prepared in the usual manner from 3 mols of trimethylolpropane,
1 mol of diethyleneglycol,
1 mol of fatty acid of linseed oil, and
3 mols of phthalic anhydride.

150 parts of this polyester are dissolved in 50 parts of styrene and homogeneously mixed with 250 parts of the 60% solution of polyisocyanate in styrene described in Example 12. By adding to the clear solution 3 parts of benzoylperoxide and 100 parts of aluminum powder a homogeneous, and entirely cross-linked plastic is obtained after casting the solution in a mold at moderately elevated temperature.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A method for making a polymer which comprises mixing an ethylenically unsaturated hydroxyl terminated polyester with an organic polyisocyanate, at least one of said components having been dissolved in an unsaturated organic solvent therefor before mixing with the other component, and effecting reaction between the hydroxyl groups and said polyisocyanate and effecting polymerization at the point of unsaturation of the polyester with said solvent to form said polymer; said solvent being from about 10 percent to less than 50 percent by weight of the resulting mixture and being selected from the group consisting of styrene and methyl methacrylate; said polyester having an hydroxyl content of from about 4.9 percent to about 9.5 percent and having been prepared by esterification of a dicarboxylic acid and at least one saturated polyhydric alcohol including one having at least three hydroxyl groups.

2. The process of claim 1 wherein the reaction mixture contains a peroxide catalyst.

3. A method for making a polymer which comprises mixing an ethylenically unsaturated polyester having terminal hydroxyl groups with an organic polyisocyanate, at least one of said components having been dissolved in styrene before mixing with the other component, and effecting reaction between said polyisocyanate and said hydroxyl groups and effecting polymerization at the point of unsaturation of the polyester and styrene; said styrene being present in the mixture in an amount of from about 10 percent to less than 50 percent by weight; said polyester having an hydroxyl content of from about 4.9 percent to about 9.5 percent and having been prepared by esterification of a mixture of a dicarboxylic acid and a mixture of a saturated glycol and a saturated trihydric alcohol.

References Cited in the file of this patent
UNITED STATES PATENTS

| | | |
|---|---|---|
| 2,462,042 | Howald et al. | Feb. 15, 1949 |
| 2,642,403 | Simon | June 16, 1953 |
| 2,740,743 | Pace | Apr. 3, 1956 |
| 2,780,613 | Rubens | Feb. 5, 1957 |